US011169601B2

United States Patent
Jackson

(10) Patent No.: US 11,169,601 B2
(45) Date of Patent: Nov. 9, 2021

(54) METHODS AND SYSTEMS FOR DETERMINING TELEOPERATING USER INTENT VIA EYE TRACKING

(71) Applicant: Toyota Research Institute, Inc., Los Altos, CA (US)

(72) Inventor: Astrid Jackson, Mountain View, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 309 days.

(21) Appl. No.: 16/033,920

(22) Filed: Jul. 12, 2018

(65) Prior Publication Data
US 2020/0019237 A1    Jan. 16, 2020

(51) Int. Cl.
*G05B 15/00* (2006.01)
*G05B 19/00* (2006.01)
(Continued)

(52) U.S. Cl.
CPC ............ *G06F 3/013* (2013.01); *B25J 9/1669* (2013.01); *B25J 9/1689* (2013.01); *B25J 9/1697* (2013.01); *G06F 3/017* (2013.01)

(58) Field of Classification Search
CPC .......... G06F 3/013; G06F 3/017; G06F 1/163; G06F 3/005; B25J 9/1669; B25J 9/1697; B25J 9/1689; B25J 13/00; G06K 9/0061; G06T 2207/30241; G05B 2219/40147; G05B 2219/40174
See application file for complete search history.

(56) References Cited

U.S. PATENT DOCUMENTS 8,745,058 B1    6/2014  Garcia-Barrio
9,690,099 B2    6/2017  Bar-Zeev et al.
(Continued)

FOREIGN PATENT DOCUMENTS

CN    102566756 B    7/2015

OTHER PUBLICATIONS

Susanna Nilsson et al., "Hands Free Interaction with Virtual Information in a Real Environment: Eye Gaze as an Interaction Tool in an Augmented Reality System", PsychNology Journal, 2009, vol. 7, No. 2, pp. 175-196, https://pdfs.semanticscholar.org/00cc/369b8c555facd85e55d9a8c77ba776761f6a.pdf.
(Continued)

*Primary Examiner* — Abby Y Lin
*Assistant Examiner* — Sohana Tanju Khayer
(74) *Attorney, Agent, or Firm* — Dinsmore & Shohl LLP

(57) ABSTRACT

Systems and methods for determining teleoperating user intent via eye tracking are provided. A method includes outputting, to a display of a gaze-tracking device utilized by a user, a representation of an environment of a robot. The method further includes receiving, from the gaze-tracking device, user gaze data corresponding to a gaze area subject to a gaze of the user within the representation. The method also includes determining a context based upon an object within the gaze area, an object type, and characteristics of the object. The method further includes receiving, via a user interface, a user input. The method also includes outputting, to the robot, a contextual command corresponding to the context and the user input.

20 Claims, 11 Drawing Sheets

(51) Int. Cl.
*G06F 3/01* (2006.01)
*B25J 9/16* (2006.01)

(56) References Cited

U.S. PATENT DOCUMENTS

| | | | |
|---|---|---|---|
| 10,394,969 B2* | 8/2019 | Sasaki | G06F 30/20 |
| 10,583,564 B2* | 3/2020 | Yokoya | A61H 3/04 |
| 2005/0080515 A1* | 4/2005 | Watanabe | B25J 9/1671 |
| | | | 700/264 |
| 2010/0153073 A1* | 6/2010 | Nagatsuka | G05B 19/4069 |
| | | | 703/1 |
| 2014/0168056 A1 | 6/2014 | Swaminathan et al. | |
| 2014/0354532 A1 | 12/2014 | Mullins | |
| 2015/0049113 A1 | 2/2015 | Rahman et al. | |
| 2015/0073596 A1* | 3/2015 | Fudaba | B25J 9/1689 |
| | | | 700/259 |
| 2015/0120048 A1* | 4/2015 | Summer | B25J 9/1692 |
| | | | 700/254 |
| 2016/0055677 A1* | 2/2016 | Kuffner | B62D 57/032 |
| | | | 345/633 |
| 2016/0207198 A1* | 7/2016 | Willfor | B25J 9/1676 |
| 2017/0015318 A1* | 1/2017 | Scofield | G08G 1/097 |
| 2017/0109936 A1* | 4/2017 | Powderly | G06F 3/0482 |
| 2017/0144300 A1* | 5/2017 | Oumi | B25J 9/161 |
| 2017/0285737 A1 | 10/2017 | Khalid et al. | |
| 2019/0213382 A1* | 7/2019 | Zhang | A61B 1/00006 |
| 2019/0362557 A1* | 11/2019 | Lacey | G06T 19/006 |

OTHER PUBLICATIONS

"Virtual Reality", Tobii Eye Tracking: the next natural step in VR, Tobii.com, May 1, 2018, 5 pages, https://www.tobii.com/tech/products/vr/.

\* cited by examiner

METHODS AND SYSTEMS FOR DETERMINING TELEOPERATING USER INTENT VIA EYE TRACKING

TECHNICAL FIELD

The present disclosure generally relates to robotic control systems and, more particularly, to methods and systems for determining teleoperating user intent for augmented reality robotics via eye tracking.

BACKGROUND

Users operate robots to perform a variety of tasks within the robot's environment. However, some objects encountered in the robot's environment may require careful attention. If a user's intended action is misinterpreted or miscommunicated to the robot, the robot may in turn act in a way not intended by the user. This may be due to a variety of reasons, such as inexperience of the user with the particular robot, human error, or an issue with the control interface. Another reason for an unintended action may include network lag due to the roundtrip time for transmitting real world information between a user and a robot.

When a robot is not appropriately operated to complete a task in accordance with the user's intent, objects in the environment may be mishandled and/or damaged. For example, if user intends to have the robot pick up a glass without having properly extended the robot arm to the correct length to grasp a glass, there could be a risk of knocking over the glass, in which the glass could fall, crack, and/or shatter. Therefore, a need exists to detect the intent of a user controlling a robot.

SUMMARY

In one embodiment, a method of utilizing gaze detection to improve teleoperative robotic object interaction is disclosed. The method includes outputting, to a display of a gaze-tracking device utilized by a user, a representation of an environment of a robot. The method further includes receiving, from the gaze-tracking device, user gaze data corresponding to a gaze area subject to a gaze of the user within the representation. The method also includes determining a context based upon an object within the gaze area, an object type, and characteristics of the object. Further still, the method includes receiving, via a user interface, a user input. The method also includes outputting, to the robot, a contextual command corresponding to the context and the user input.

In another embodiment, a robotic teleoperative system for utilizing gaze detection to improve teleoperative robotic object interaction includes a processing device. The robotic teleoperative system also a non-transitory, processor-readable storage medium, the non-transitory, processor-readable storage medium comprising one or more programming instructions that, when executed, cause the processing device to output, to a display of a gaze-tracking device utilized by a user, a representation of an environment of a robot. The instructions further cause the processing device to receive, from the gaze-tracking device, user gaze data corresponding to a gaze area subject to a gaze of the user within the representation. The instructions also cause the processing device to determine a context based upon an object within the gaze area, an object type, and characteristics of the object. The instructions further cause the processing device to receive, via a user interface, a user input. The instructions also cause the processing device to output, to the robot, a contextual command corresponding to the context and the user input.

In yet another embodiment, a system comprises a user worn device having a display that displays an environment of a robot to a user. The system further comprises a gaze tracking module that tracks the gaze of the user in a scene of the environment displayed by the display. The system also comprises a gesture tracking module that tracks the user's other physical movements. The system additionally comprises a processing device that determines a type of object the user is viewing from information received from the gaze tracking module and current actions that the user is completing from information received from the gesture tracking module. The processing device also uses the type of object and current actions to determine a context and the user's intent such that the user's gestures can be accurately mapped to a virtual object movement within the environment of the robot. The processing device additionally instructs the robot to perform the contextual command in a manner that differs from the user's other physical movements.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to methods and systems for determining teleoperating user intent via eye tracking. A user may remotely operate a device, such as a robot, utilizing a gaze-tracking device worn by the user. The gaze tracking device may receive imaging data from the robot to provide a representation of the robot's environment. The gaze tracking device may receive the gaze of the user within the representation of the robot's environment. A context may be determined based upon an object within the gaze area, an object type, and characteristics of the object. After physical movement receiving from the user is received, a contextual command may be output to the robot that corresponding to the context and the object. These features may be utilized to allow users to more accurately and efficiently interact with objects teleoperatively based upon the context of the user's command that includes characteristics of the object that the user gazes upon, the robot being remotely operated, and the surrounding environment of the object.

Figure 1:
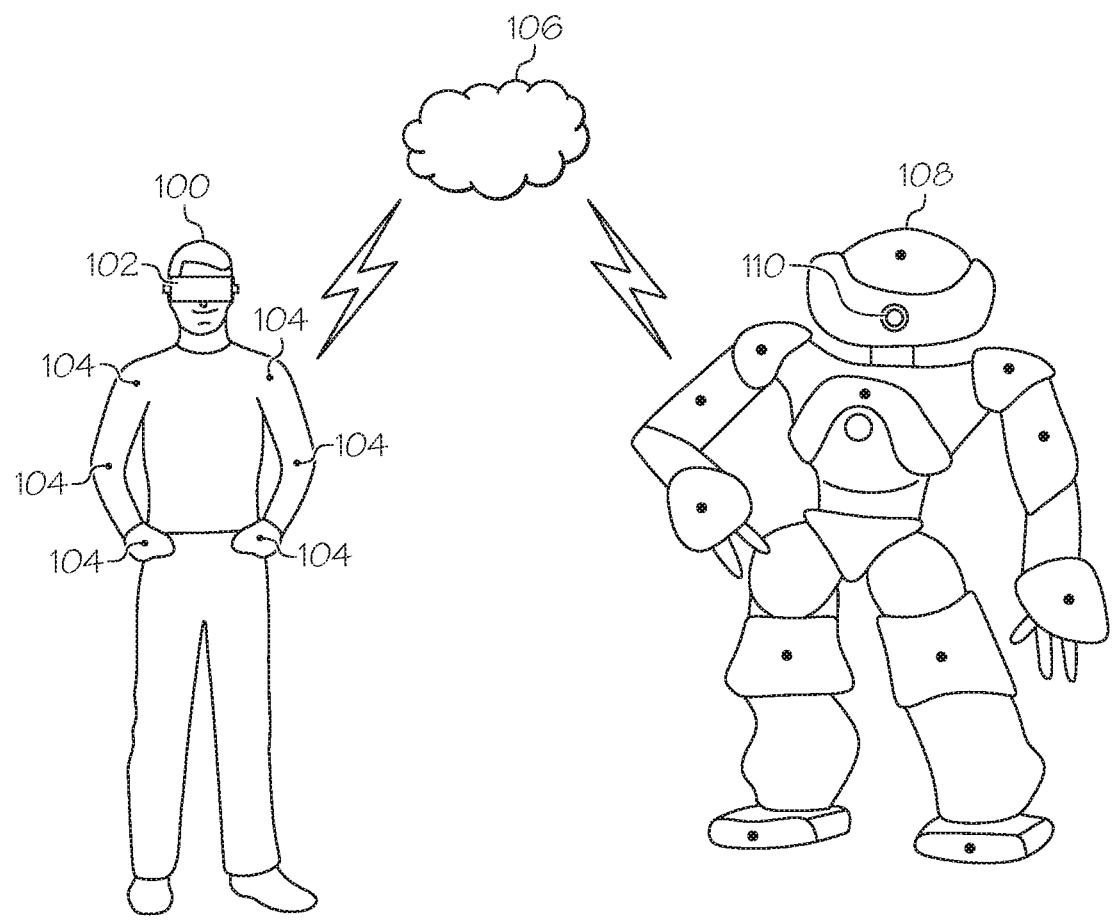
FIG. 1 depicts a diagram schematically illustrating an exemplary gaze-detection device and sensors worn by a user connected to a network and a robot utilizing an imaging device, according one or more embodiments shown and described herein.

Referring now to FIG. 1, an exemplary frontal view illustrates an exemplary embodiment featuring a visual interface device and sensors worn by a user connected to a network and robot utilizing an imaging device. As depicted, a user 100 may wear a visual interface device 102 and sensors 104. As discussed herein, a visual interface device 102 may utilize a display (LED, OLED, plasma, etc.) to output image data to the user's eyes and an image tracking component/camera (still, video, digital, analog, etc.) to track the gaze of the user 100. Any suitable type of visual interface device 102 may be utilized, such as a wearable headset, augmented reality (AR) glasses, etc. One or more visual interface devices 102 may interface with one or both eyes of the user 100. In some embodiments, more than one visual interface device 102 may interface with a single eye. In other embodiments, a single visual interface device 102 may interface with a single eye. The user 100 may wear one or more sensors 104, there may be one or more sensors 104 may be located remotely from the user 100, and/or any combination thereof. Any suitable type of sensor 104 (motion, lidar, radar, visual, tactile, time of flight, etc.) may be utilized to detect motions/gestures from any suitable portion of the user 100, such as by way of non-limiting example hands, feet, legs, and/or arms. In some embodiments, input components (joysticks, button pads, etc.) may be held and utilized by the user to receive input from the user.

The visual interface device 102 may be connected via a network 106 to a robot 108. As discussed herein, any suitable quantity and/or type(s) of network(s) 106 may be utilized to facilitate communication between the interface device 102, sensors 104, and robot 108. In this embodiment, an imaging device 110 may be utilized within the robot 108. In some embodiments, the imaging device 110 may be directly connected to the network 106. Any suitable quantity and/or type of imaging devices 110 located within the robot 108 may be utilized, external to the robot 108, or any combination thereof. In some embodiments, the user 100 and the robot 108 may not be located in the same environment (i.e., the robot 108 may be located remotely from the user 100). While the robot 100 depicted in FIG. 1 is humanoid, this disclosure is not limited to such. For example, the robot 100 may be any suitable robotic device, such as a robotic arm, surgical equipment, a bomb diffusing device, or the like.

Figure 2:
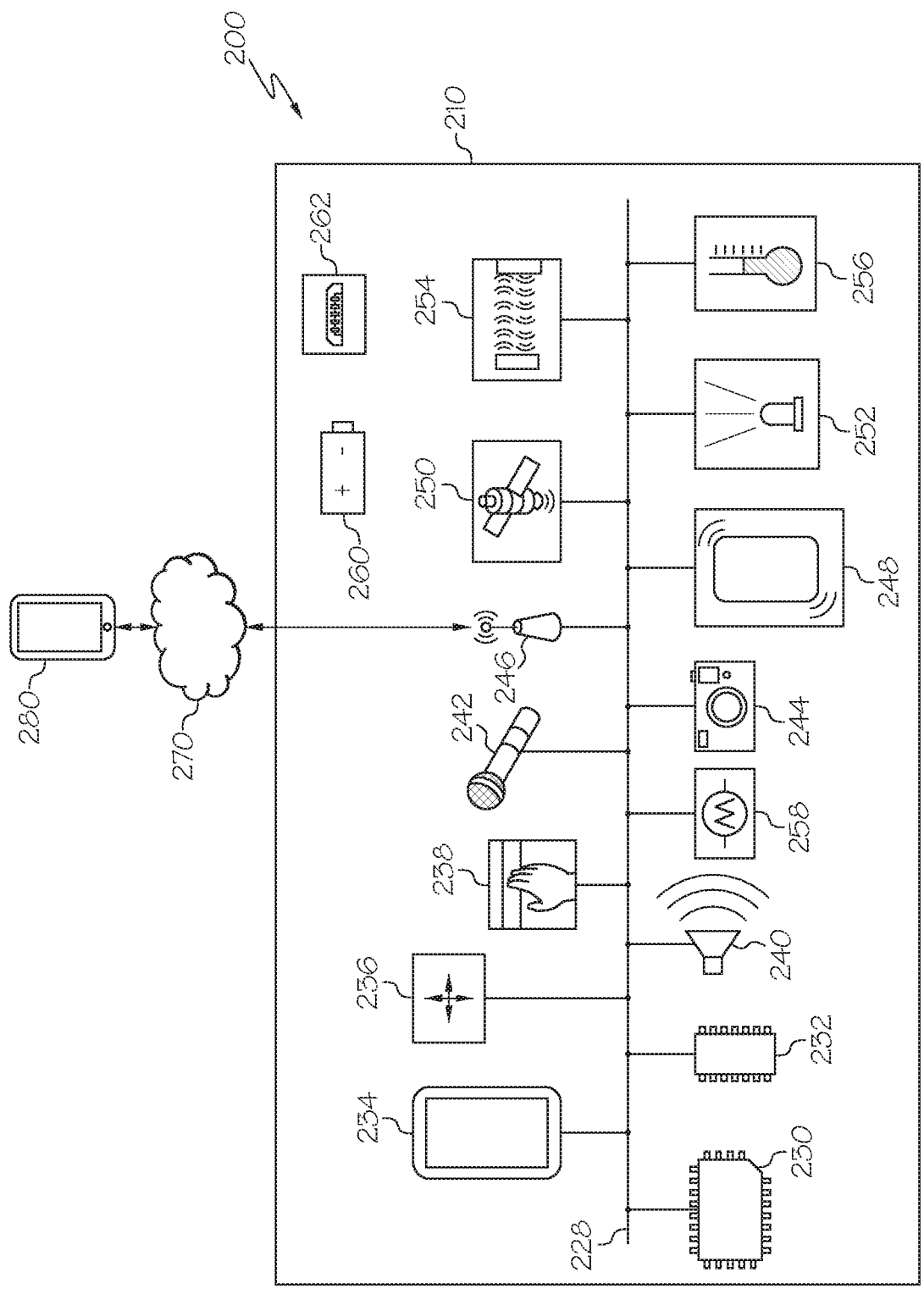
FIG. 2 schematically illustrates exemplary components of a robot utilized for teleoperation, according one or more embodiments shown and described herein.

Turning to FIG. 2, example components of one embodiment of a robot 200 are schematically depicted. The robot 200 includes a housing 210, a communication path 228, a processor 230, a memory module 232, an inertial measurement unit 236, an input device 238, an audio output device 240 (e.g., a speaker), a microphone 242, a camera 244, network interface hardware 246, a tactile feedback device 248, a location sensor 250, a light 252, a proximity sensor 254, a temperature sensor 256, a motorized wheel assembly 258, a battery 260, and a charging port 262. The components of the robot 200 other than the housing 210 may be contained within or mounted to the housing 210. The various components of the robot 200 and the interaction thereof will be described in more detail herein.

Still referring to FIG. 2, the communication path 228 may be formed from any medium that may be capable of transmitting a signal such as, for example, conductive wires, conductive traces, optical waveguides, or the like. Moreover, the communication path 228 may be formed from a combination of mediums capable of transmitting signals. In one embodiment, the communication path 228 comprises a combination of conductive traces, conductive wires, connectors, and buses that cooperate to permit the transmission of electrical data signals to components such as processors, memories, sensors, input devices, output devices, and communication devices. Accordingly, the communication path 228 may comprise a bus. Additionally, it is noted that the term "signal" may mean a waveform (e.g., electrical, optical, magnetic, mechanical or electromagnetic), such as DC, AC, sinusoidal-wave, triangular-wave, square-wave, vibration, and the like, capable of traveling through a medium. The communication path 228 communicatively couples the various components of the robot 200. As used herein, the term "communicatively coupled" means that coupled components are capable of exchanging data signals with one another such as, for example, electrical signals via conductive medium, electromagnetic signals via air, optical signals via optical waveguides, and the like.

The processor 230 of the robot 200 may be any device capable of executing machine-readable instructions. Accordingly, the processor 230 may be a controller, an integrated circuit, a microchip, a computer, or any other computing device. The processor 230 may be communicatively coupled to the other components of the robot 200 by the communication path 228. Accordingly, the communication path 228 may communicatively couple any number of processors with one another, and allow the components coupled to the communication path 228 to operate in a distributed computing environment. Specifically, each of the components may operate as a node that may send and/or receive data. While the embodiment depicted in FIG. 2 includes a single processor 230, other embodiments may include more than one processor.

Still referring to FIG. 2, the memory module 232 of the robot 200 may be coupled to the communication path 228 and communicatively coupled to the processor 230. The memory module 232 may comprise RAM, ROM, flash memories, hard drives, or any non-transitory memory device capable of storing machine-readable instructions such that the machine-readable instructions can be accessed and executed by the processor 230. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 232. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single memory module 232, other embodiments may include more than one memory module.

Two sensors 234 (visual, weight, tactile, radar, lidar, infrared, time of flight, etc.) are depicted on the robot 200, although any suitable number (including none) may be utilized, and include any suitable hardware such as processors, memory, wired/wireless communication and/or power components. The sensors 234 may, but need not be, of the same type and/or model. A sensor 234 may be included on any suitable portion of the robot 200, without regard to the placement of other sensors 234. The inertial measurement unit 236, if provided, may be coupled to the communication path 228 and communicatively coupled to the processor 230. The inertial measurement unit 236 may include one or more accelerometers and one or more gyroscopes. The inertial measurement unit 236 transforms sensed physical movement of the robot 200 into a signal indicative of an orientation, a rotation, a velocity, or an acceleration of the robot 200. The operation of the robot 200 may depend on an orientation of the robot 200 (e.g., whether the robot 200 is horizontal, tilted, and the like). Some embodiments of the robot 200 may not include the inertial measurement unit 236, such as embodiments that include an accelerometer but not a gyroscope, embodiments that include a gyroscope but not an accelerometer, or embodiments that include neither an accelerometer nor a gyroscope.

Still referring to FIG. 2, one or more input devices 238 are coupled to the communication path 228 and communicatively coupled to the processor 230. The input device 238 may be any device capable of transforming user contact into a data signal that can be transmitted over the communication path 228 such as, for example, a button, a switch, a knob, a microphone or the like. In some embodiments, the input device 238 includes a power button, a volume button, an activation button, a scroll button, or the like. The one or more input devices 238 may be provided so that the user may interact with the robot 200, such as to navigate menus, make selections, set preferences, and other functionality described herein. In some embodiments, the input device 238 includes a pressure sensor, a touch-sensitive region, a pressure strip, or the like. It should be understood that some embodiments may not include the input device 238. As described in more detail herein, embodiments of the robot 200 may include multiple input devices disposed on any surface of the housing 210. In some embodiments, one or more of the input devices 238 are configured as a fingerprint sensor for unlocking the robot. For example, only a user with a registered fingerprint may unlock and use the robot 200.

The speaker 240 (i.e., an audio output device) may be coupled to the communication path 228 and communicatively coupled to the processor 230. The speaker 240 transforms audio message data from the processor 230 of the robot 200 into mechanical vibrations producing sound. For example, the speaker 240 may provide to the user navigational menu information, setting information, status information, information regarding the environment as detected by image data from the one or more cameras 244, and the like. However, it should be understood that, in other embodiments, the robot 200 may not include the speaker 240.

The microphone 242 may be coupled to the communication path 228 and communicatively coupled to the processor 230. The microphone 242 may be any device capable of transforming a mechanical vibration associated with sound into an electrical signal indicative of the sound. The microphone 242 may be used as an input device 238 to perform tasks, such as navigate menus, input settings and parameters, and any other tasks. It should be understood that some embodiments may not include the microphone 242.

Still referring to FIG. 2, the camera 244 may be coupled to the communication path 228 and communicatively coupled to the processor 230. The camera 244 may be any device having an array of sensing devices (e.g., pixels) capable of detecting radiation in an ultraviolet wavelength band, a visible light wavelength band, or an infrared wavelength band. The camera 244 may have any resolution. The camera 244 may be an omni-directional camera or a panoramic camera. In some embodiments, one or more optical components, such as a mirror, fish-eye lens, or any other type of lens may be optically coupled to the camera 244. For example, the imaging device 110 utilized in the robot 108 discussed herein may be a camera 244 or any other type of imaging-capturing device.

The network interface hardware 246 may be coupled to the communication path 228 and communicatively coupled to the processor 230. The network interface hardware 246 may be any device capable of transmitting and/or receiving data via a network 270. Accordingly, network interface hardware 246 can include a wireless communication module configured as a communication transceiver for sending and/or receiving any wired or wireless communication. For example, the network interface hardware 246 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 246 includes hardware configured to operate in accordance with the Bluetooth wireless communication protocol. In another embodiment, network interface hardware 246 may include a Bluetooth send/receive module for sending and receiving Bluetooth communications to/from a portable electronic device 280. The network interface hardware 246 may also include a radio frequency identification ("RFID") reader configured to scan and read RFID tags.

In some embodiments, the robot 200 may be communicatively coupled to a portable electronic device 280 via the network 270. In some embodiments, the network 270 is a personal area network that utilizes wireless (e.g., Bluetooth) technology to communicatively couple the robot 200 and the portable electronic device 280. In other embodiments, the network 270 may include one or more computer networks (e.g., a personal area network, a local area network, or a wide area network), cellular networks, satellite networks and/or a global positioning system and combinations thereof. Accordingly, the robot 200 can be communicatively coupled to the network 270 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The location sensor 250 may be coupled to the communication path 228 and communicatively coupled to the processor 230. The location sensor 250 may be any device capable of generating an output indicative of a location. In some embodiments, the location sensor 250 includes a global positioning system (GPS) sensor, though embodiments are not limited thereto. Some embodiments may not include the location sensor 250, such as embodiments in which the robot 200 does not determine a location of the robot 200 or embodiments in which the location may be determined in other ways (e.g., based on information received from the camera 244, the microphone 242, the network interface hardware 246, the proximity sensor 254, the inertial measurement unit 236 or the like). The location sensor 250 may also be configured as a wireless signal sensor capable of triangulating a location of the robot 200 and the user by way of wireless signals received from one or more wireless signal antennas.

The motorized wheel assembly 258 may be coupled to the communication path 228 and communicatively coupled to the processor 230, where the wheel assembly in some embodiments corresponds to wheels 318 as discussed herein. As described in more detail herein, the motorized wheel assembly 258 includes motorized wheels (not shown) that are driven by one or motors (not shown). The processor 230 may provide one or more drive signals to the motorized wheel assembly 258 to actuate the motorized wheels such that the robot 200 travels to a desired location, such as a location that the user wishes to acquire environmental information (e.g., the location of particular objects within at or near the desired location).

Still referring to FIG. 2, the light 252 may be coupled to the communication path 228 and communicatively coupled to the processor 230. The light 252 may be any device capable of outputting light, such as, but not limited to, a light emitting diode, an incandescent light, a fluorescent light, or the like. Some embodiments include a power indicator light that is illuminated when the robot 200 is powered on. Some embodiments include an activity indicator light that is illuminated when the robot 200 is active or processing data. Some embodiments include an illumination light for illuminating the environment in which the robot 200 is located. Some embodiments may not include the light 252.

The proximity sensor 254 may be coupled to the communication path 228 and communicatively coupled to the processor 230. The proximity sensor 254 may be any device capable of outputting a proximity signal indicative of a proximity of the robot 200 to another object. In some embodiments, the proximity sensor 254 may include a laser scanner, a capacitive displacement sensor, a Doppler effect sensor, an eddy-current sensor, an ultrasonic sensor, a magnetic sensor, an optical sensor, a radar sensor, a lidar sensor, a sonar sensor, or the like. Some embodiments may not include the proximity sensor 254, such as embodiments in which the proximity of the robot 200 to an object is determine from inputs provided by other sensors (e.g., the camera 244) or embodiments that do not determine a proximity of the robot 200 to an object, obstacle, person, etc. For example, the imaging device 110 in the robot 108 discussed herein may be a lidar sensor or any other type of imaging sensor.

The temperature sensor 256 may be coupled to the communication path 228 and communicatively coupled to the processor 230. The temperature sensor 256 may be any device capable of outputting a temperature signal indicative of a temperature sensed by the temperature sensor 256. In some embodiments, the temperature sensor 256 may include a thermocouple, a resistive temperature device, an infrared sensor, a bimetallic device, a change of state sensor, a thermometer, a silicon diode sensor, or the like. Some embodiments of the robot 200 may not include the temperature sensor 256.

Still referring to FIG. 2, the robot 200 may be powered by the battery 260, which may be electrically coupled to the various electrical components of the robot 200. The battery 260 may be any device capable of storing electric energy for later use by the robot 200. In some embodiments, the battery 260 is a rechargeable battery, such as a lithium-ion battery or a nickel-cadmium battery. In embodiments in which the battery 260 is a rechargeable battery, the robot 200 may include the charging port 262, which may be used to charge the battery 260. Some embodiments may not include the battery 260, such as embodiments in which the robot 200 is powered by the electrical grid, by solar energy, or by energy harvested from the environment. Some embodiments may not include the charging port 262, such as embodiments in which the robot 200 utilizes disposable batteries or removable rechargeable batteries for power.

Still referring to FIG. 2, as stated herein, the network 270 may be utilized to communicatively couple the robot 200 with the portable electronic device 280. The portable electronic device 280 may include a mobile phone, a smartphone, a personal digital assistant, a camera, a dedicated mobile media player, a mobile personal computer, a laptop computer, and/or any other portable electronic device capable of being communicatively coupled with the robot 200. The portable electronic device 280 may include one or more processors and one or more memories. The one or more processors can execute logic to communicate with the robot 200. The portable electronic device 280 may be configured with wired and/or wireless communication functionality for communicating with the robot 200. In some embodiments, the portable electronic device 280 may perform one or more elements of the functionality described herein, such as in embodiments in which the functionality described herein is distributed between the robot 200 and the portable electronic device 280.

Figure 3:
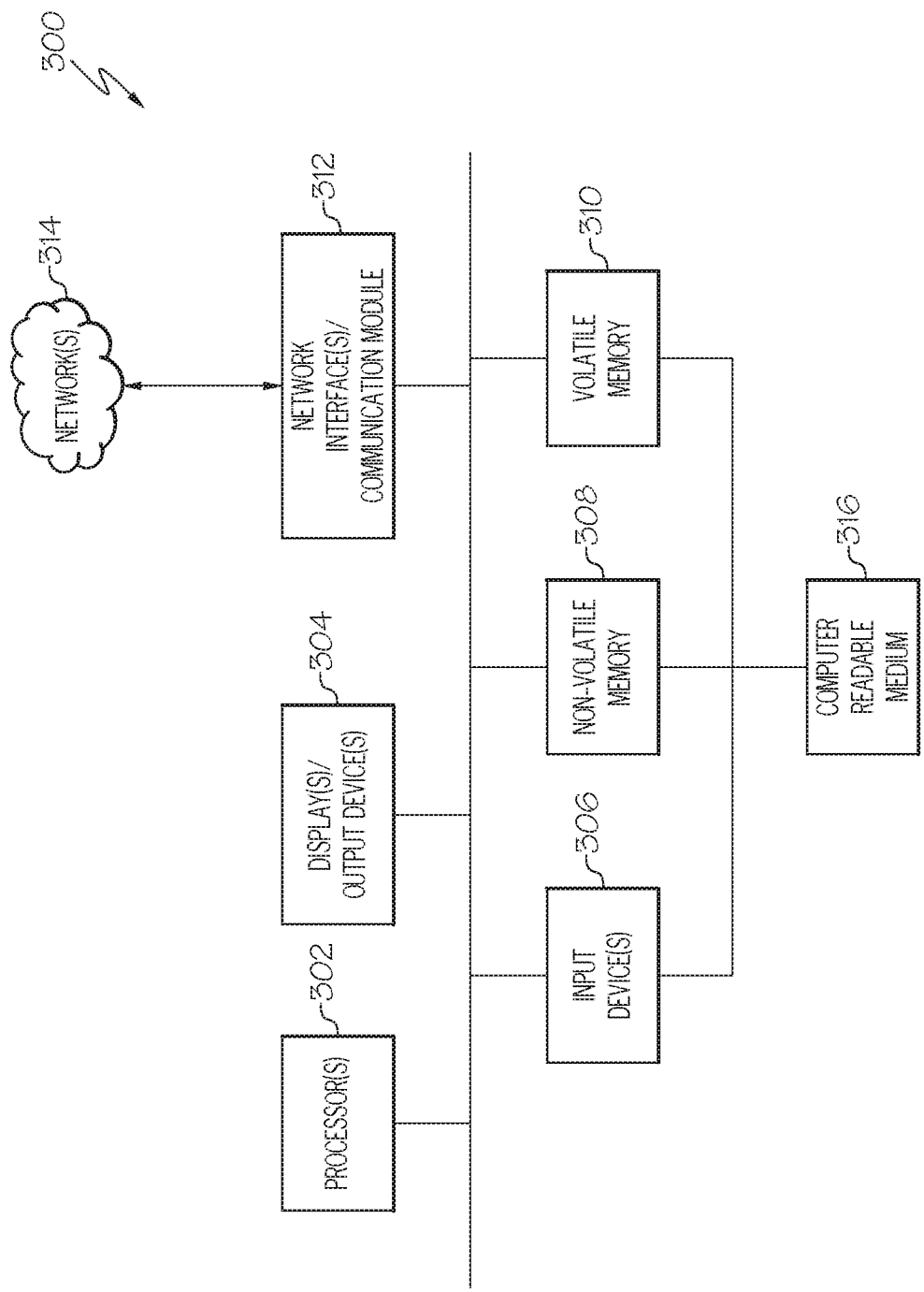
FIG. 3 schematically illustrates exemplary components of a computing device utilized in an imaging system, according to one or more embodiments shown and described herein.

Turning to FIG. 3, a block diagram illustrates an exemplary computing device 300 through which embodiments of the disclosure can be implemented, such as, for example, in the visual interface device 102 depicted in FIG. 1. The computing device 300 described herein is but one example of a suitable computing device and does not suggest any limitation on the scope of any embodiments presented. Nothing illustrated or described with respect to the computing device 300 should be interpreted as being required or as creating any type of dependency with respect to any element or plurality of elements. In various embodiments, a computing device 300 may include, but need not be limited to, a desktop, laptop, server, client, tablet, smartphone, in-robot computing devices, imaging devices, or any other type of device that can utilize data. In an embodiment, the computing device 300 includes at least one processor 302 and memory (non-volatile memory 308 and/or volatile memory 310). The computing device 300 may include non-volatile memory 308 (ROM, flash memory, etc.), volatile memory 310 (RAM, etc.), or a combination thereof. In some embodiments, the at least one processor 302 is coupled to the non-volatile memory 308 and/or volatile memory 310. The computing device 300 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The computing device 300 can include one or more displays and/or output devices 304 such as monitors, speakers, headphones, projectors, wearable-displays, holographic displays, and/or printers, for example. This may be utilized, for example, by a visual interface device 102 discussed herein with respect to FIG. 1 in the form of a display for the user's eyes. The computing device 300 may further include one or more input devices 306 which can include, by way of example, any type of mouse, keyboard, disk/media drive, memory stick/thumb-drive, memory card, pen, touch-input device, biometric scanner, voice/auditory input device, motion-detector, camera, scale, etc. This may be utilized, for example, by the tracking component in a visual interface device 102 as discussed herein with respect to FIG. 1 in the form of a camera to detect/track a user's gaze.

A network interface 312 can facilitate communications over a network 314 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The computing device 300 may include one or more network interfaces 312 to facilitate communication with one or more remote devices, which may include, for example, client and/or server devices. A network interface 312 may also be described as a communications module, as these terms may be used interchangeably. Network interface 312 can be communicatively coupled to any device capable of transmitting and/or receiving data via the network 314. Accordingly, the network interface hardware 312 can include a communication transceiver for sending and/or receiving any wired or wireless communication. In one embodiment, network interface hardware 312 can be utilized for the visual interface device 102 to communicate with a robot 108 as discussed herein.

For example, the network interface hardware 312 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 316 may comprise a plurality of computer readable mediums, each of which may be either a computer readable storage medium or a computer readable signal medium. A computer readable medium 316 may reside, for example, within an input device 306, non-volatile memory 308, volatile memory 310, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media are non-transitory, and exclude propagated signals and carrier waves.

Figure 4A:
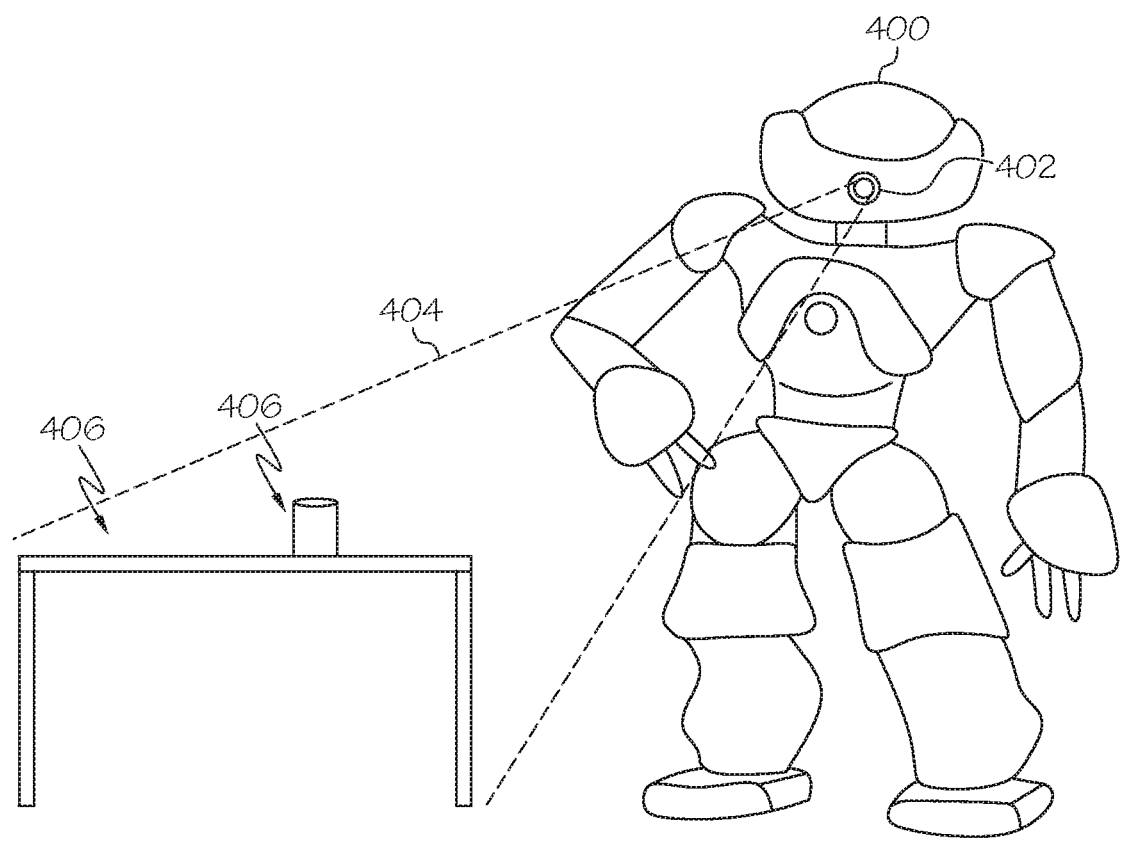
FIG. 4A depicts a frontal view of an exemplary robot scanning objects in the surrounding environment, according to one or more embodiments described and illustrated herein.

Turning to FIG. 4A, an example of a robot scanning objects in the surrounding environment is depicted. As discussed herein, the robot 400 may utilize one or more imaging devices 402 to scan the surrounding environment. As also discussed herein, an imaging device 402 may utilize any suitable type of data to obtain a representation of the robot's environment, such as visual light (RGB), lidar (point-cloud), a combination thereof (augmented reality), infrared, radar, sonar, or any other type of detection that can produce a visualization of an environment. The robot 400 may perform object and/or image recognition on any objects 406 within the robot field of view 404. In this example, the objects 406 detected include a table and a glass sitting upon the table. The robot 400 may move its field of view 404 at any time and in any direction. In some embodiments, multiple imaging devices 402 may be utilized for a single robot field of view 404, which may provide for a depth-based view, such as stereoscopic vision. Object recognition may be performed upon objects 406 in the robot field of view 404 within the robot's environment by utilizing one or more object databases of known objects and/or known object types, a neural network implementation (or any other suitable machine-learning implementation) to perform object recognition, or any other suitable type of implementation for object recognition. In some embodiments, image segmentation may be utilized for object recognition, whereby an image from the robot may be split up into multiple segments in order to simplify processing of the image into subsets that are easier to analyze. Image segmentation may be utilized by itself or in combination with other techniques, such as neural network analysis (or any other suitable machine-learning implementation), for object recognition.

Figure 4B:
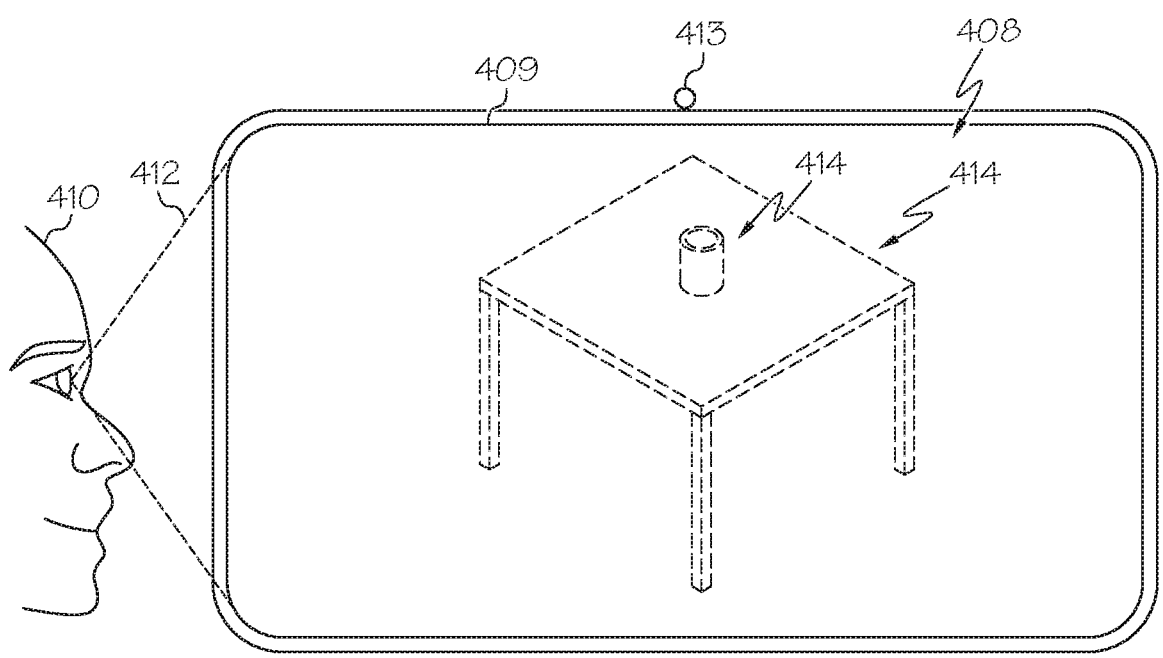
FIG. 4B depicts a side view of a user gazing at an exemplary virtual representation of an object detected by object recognition performed on the robot's environment, according to one or more embodiments shown and described herein.

Turning to FIG. 4B, a side view depicts an example of a user gazing at an exemplary virtual representation of the robot's environment corresponding to the scan(s) performed by the robot in FIG. 4A. In this embodiment, an environment representation 408 may be provided to the user 410 on a visual output device 409. In this embodiment, the visual output device 409 is located within the visual interface device 102 discussed herein with respect to FIG. 1. In other embodiments, the visual output device 409 may be located external to the visual interface device 102. The visual output device 409 may be LCD, LED, plasma, OLED, CRT, projection, holographic, or any other type of output display for suitable gazing. In this embodiment, the environment representation 408 may correspond to data obtained from the robot's imaging device 402, where the data may be directly utilized from the robot's imaging device 402 or may be modified before delivery to the visual output device 409 in the form of the environment representation 408.

One or more gaze detectors 413 may be utilized to track user gaze 412, where a gaze detector 413 may be a camera or any other suitable device for tracking user gaze 412. In this embodiment, a gaze detector 413 may be located within the visual interface device 102 discussed herein. In other embodiments, one or more gaze detectors 413 may be located external to the visual interface device 102, within the visual interface device 102, or any combination thereof. In this embodiment, a gaze detector 413 tracks a user gaze 412 with respect to the environment representation 408 received from the robot 400. In other embodiments, the environment representation 408 may comprise data received from multiple robots 400 in the environment. Object representations 414, corresponding to objects 406 in the robot field of view 404 as depicted in FIG. 4A, may also be depicted as object representations 414 as part of the environment representation 408. Continuing with the embodiment depicted in FIG. 4A, the environment representation 408 includes object representations 414 of the table and the glass sitting upon the table. The user gaze 412 directed towards one or more object representations 414 within the environment representation 408 may also be detected by a gaze detector 413.

Figure 4C:
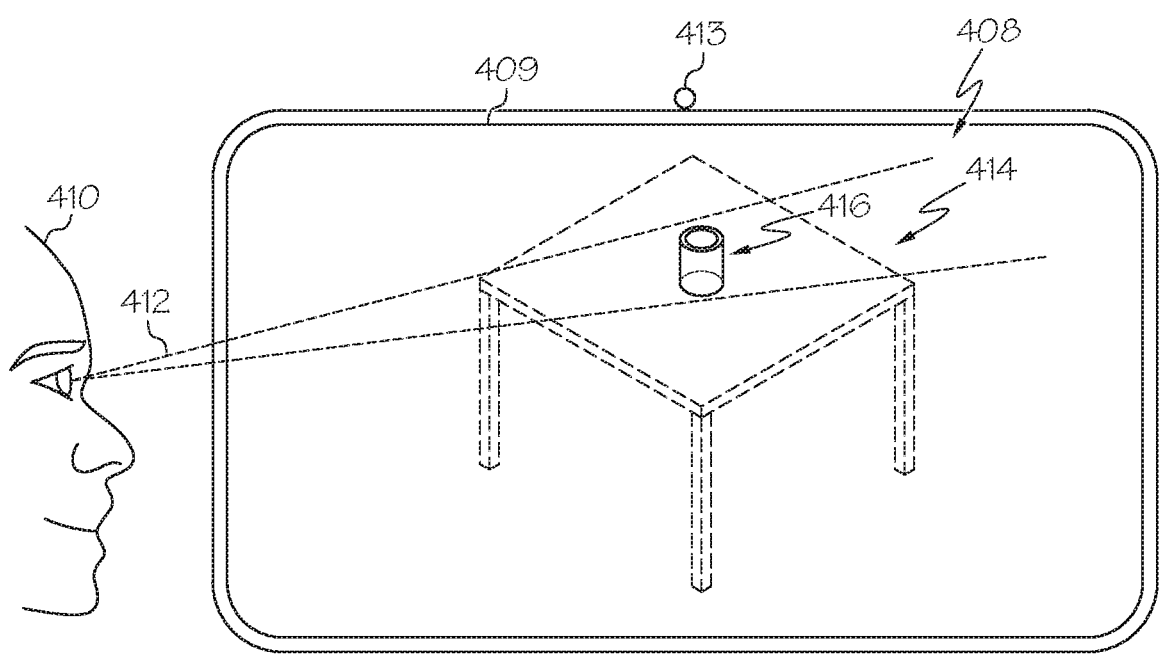
FIG. 4C depicts a side view of the user selecting the detected object via the user's gaze, according to one or more embodiments shown and described herein.

Turning to FIG. 4C, a side view depicts an example of the user depicted in FIG. 4B selecting the detected object utilizing their gaze. While multiple object representations 414 are presented in the environment representation 408 (i.e., candidate objects), the user gaze 412 in this embodiment is now generally directed towards a selected object representation 416, in this example the glass sitting upon the table. In this embodiment, once an object representation 414 is determined to be the focus of the user gaze 412, it may be designated as the selected object representation 416. In other embodiments, there may be more than one selected object representation 416 at a time. An object representation 414 may be determined to be a selected object representation 416 according to one or more suitable criteria. By way of a non-limiting example, criteria may include the length of time that a user gaze 412 is focused upon an object representation 414 and/or an amount of time that a user gaze 412 temporarily leaves an object representation 414 before returning to it. Another criterion may include how closely a user gaze 412 follows an object representation 414 as the object representation 414 moves relative to the environment representation 408 and/or the visual output device 409 due to movement of the robot field of view 404 and/or movement of the corresponding object 406 as reflected in the environment representation 408. Any type of threshold, such as one or more confidence thresholds related to characteristics and/or historical data relative to the user 410, the robot 400, the visual interface device 102, the object 406, and/or the object representation 414 may be utilized to make a determination as to whether an object representation 414 becomes and/or remains designated as a selected object representation 416. In a similar way, an object representation 414 may first be identified as a potential object of interest prior to being designated as a selected object representation 416. Such an object representation 414 may be presented in any suitable way to the user 410 in an attempt to receive confirmation that the object representation 414 is the intended subject of the user gaze 412. In some embodiments, confirmation of an intended object may be based upon the amount of time the user 410 focuses on an object representation 414, such as satisfying a minimum user gaze duration. A user 410 may provide an input, such as one or more blinks from one or both eyes (or any suitable eye-based input, such as eye movement), to provide confirmation that a potential object of interest is indeed a selected object representation 416. In some embodiments, other types of user inputs may be utilized to provide confirmation, such as a verbal confirmation, a button input, a gesture, and/or the like. Any suitable visual designation of an object representation 414 may be utilized, such as having the object representation 414 flash, be denoted with a different style (solid lines if normally represented as a part of a point cloud or vice-versa), change color, utilize a text label on/near the object representation 414, etc.

In this embodiment, once an object becomes a selected object representation 416, its appearance may also be altered to designate it as such. By way of non-limiting example, if object representations 414 are displayed as point cloud representations, a designated object may be represented utilizing solid lines to form an outline to designate it as a selected object representation 416. In this example, the glass may be a selected object representation 416 due to its solid outline, which contrasts with the rest of the environment representation 408.

Figure 5A:
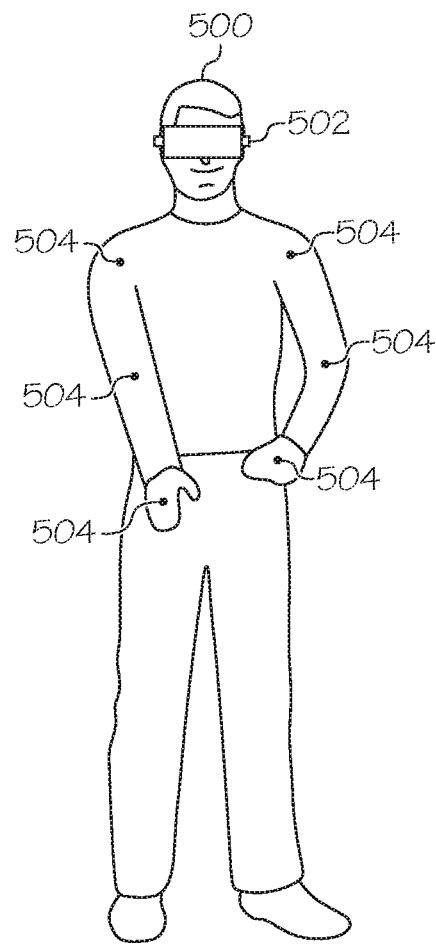
FIG. 5A depicts a frontal view of a user making an exemplary gesticular movement while wearing a gaze-tracking device and sensors, according to one or more embodiments shown and described herein.

Turning to FIG. 5A, a frontal view depicts an embodiment of a user making an exemplary gesture while wearing a gaze-tracking device and sensors. In this example, the user 500 is making a gesture by fully extending an arm while wearing a visual interface device 502 and sensors 504 attached to the arms of the user 500. In other embodiments, the user may utilize remote motion sensors instead of or in combination with one or more worn sensors 504 to detect motion of the user 500. By way of non-limiting example, the extension of the arm of the user 500 may be measured by the sensors 504 and output as a command to the robot discussed herein. While moving their arm, the user 500 may view the action of the robot utilizing the visual interface device 502 in real-time or near real-time to see the effect of their arm movement upon the robot. In other embodiments, motion may be detected in other parts of the user's body including the head, torso, legs, etc. In still other embodiments, when latency occurs, the movement of a user 500 may be delayed in its transmission to the robot. Latency may be encountered for a variety of reasons, such as due to hardware/software slow-down experienced in the robot and/or user interface device, due to network congestion between the robot, user, and/or network, and/or due any other type of connectivity issues. Latency may manifest, for example, as delays in communications involving an environment representation, user gaze data, user input, and/or a contextual command. In yet other embodiments, eye movements of the user 500 and/or visual output to the user 500 may be performed remotely without a visual interface device 502, such as with one or more cameras that are remote from the user 500 and/or one or more remote displays that are remote to the user 500.

Figure 5B:
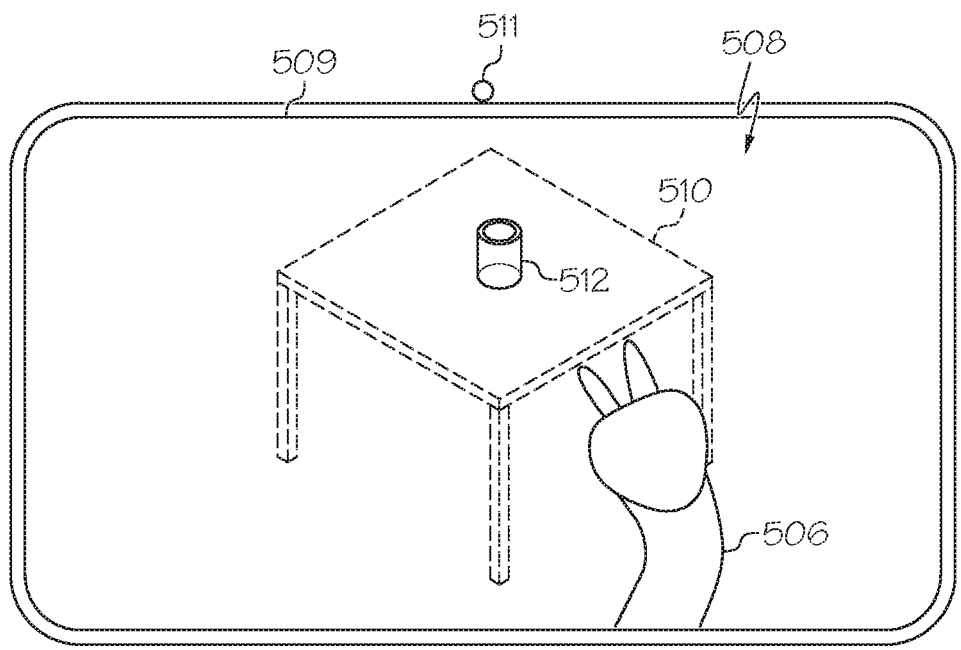
FIG. 5B depicts a virtual representation of a modified robot gesticular movement displayed to the user, according to one or more embodiments shown and described herein.

Turning to FIG. 5B, a frontal view depicts an example of a robot contextual movement representation displayed to the user corresponding to the straight-arm extension of the user as depicted in FIG. 5A. In this embodiment, a point cloud representation is utilized, and as discussed herein in the embodiment depicted in FIG. 4C, a selected object representation 512 may be depicted with solid lines to visually designate it as such, while an object representation 510 that has not been selected may be presented in a point cloud representation. In other embodiments, any suitable graphical representations for selected object representations 512 and/or object representations 510 may be utilized. In this embodiment, a robot contextual movement representation 506 in the form of an arm of the robot is presented with solid lines in contrast to the point cloud representation of the environment representation 508. This may be due, by way of non-limiting example, to the robot arm not being detected by lidar sensors on the robot or due to post-processing of the lidar image to help the robot contextual movement representation 506 contrast with the rest of the environment representation 508. As depicted in this embodiment, the robot contextual movement representation 506 represents the current movement of the robot arm. In other embodiments, a robot contextual movement representation 506 may represent a potential future movement to show the user a preview of the robot's arm movement. In some embodiments, if latency is encountered, a determination of the contextual movement and/or propagation of a contextual command to the robot may be delayed in order to eliminate or alleviate disconnect between the user's current movements and the robot's contextual movements.

While the robot contextual movement representation 506 corresponds to the full-extension of the arm of the user 500 detected by the sensors 504 as depicted in FIG. 5A, in this example the robot contextual movement representation 506 depicts the robot arm being bent, rather than fully extended. Thus, in this example, the robot arm movement (and the robot contextual movement representation 506) may differ from the movements of the user 500. Specifically, the intent of the user 500 may be taken into account when translating user movement into the corresponding commands and/or movements of the robot. In this example, the user 500 reaches for the selected object representation 512 of a glass as depicted in the environment representation 508, based upon the user 500 having indicated that the glass is an object of interest. The user 500 has fully extended their arm to reach for the glass based upon what is displayed on the visual output device 509 of their visual interface device 502. However, the robot contextual movement representation 506 depicts the robot arm as not being fully extended, but bent. In this example, this is because having the robot arm fully extended while reaching for the glass would knock the glass off of the table. Instead, by maintaining a bent arm, the robot can maintain the proper length to grab the glass. By determining that the glass was the selected object representation 512 and that the user had extended an arm, a determination may be made that the context of the user's movement was/is to have the robot grab the glass. By way of non-limiting example, the context may be based upon the selected object 520, the object's type, characteristics of the object 520, characteristics of the user 500, characteristics of the robot 514, characteristics of the visual interface device 502, etc. In various embodiments, any suitable type of context may be determined based upon one or more selected object representations 512 and one or more movements of a user 500. In various embodiments, the context may be determined based upon a neural network implementation (or any other suitable machine-learning implementation) and/or any suitable criteria such as historical data associated with the user 500, the visual interface device 502, the robot 514, and/or the selected object 520. In some embodiments, the contextual command may be based upon a confidence threshold determined via a neural network and/or any suitable criteria.

In some embodiments, if an object representation 510 is determined to be an obstacle, then the robot contextual movement representation 506 and/or the movement of the robot 514 may be modified and/or aborted. For example, if another object such as a vase would be knocked over by having the robot 514 reach for the selected object 520, then the movement of the robot 514 and/or the robot arm 516 could be modified in way that avoid touching the vase, while still having the robot 514 reach for the selected object 520. The robot contextual movement representation 506 and/or the movement of the robot 514 may also be modified and/or aborted for other reasons, such as where the contextual command cannot be resolved. For example, the vase may be located in such a way as to prevent the robot 514 from being able to interact with the selected object 520, at least based upon current conditions, and the contextual command may be aborted despite having been received from the user 500.

Figure 5C:
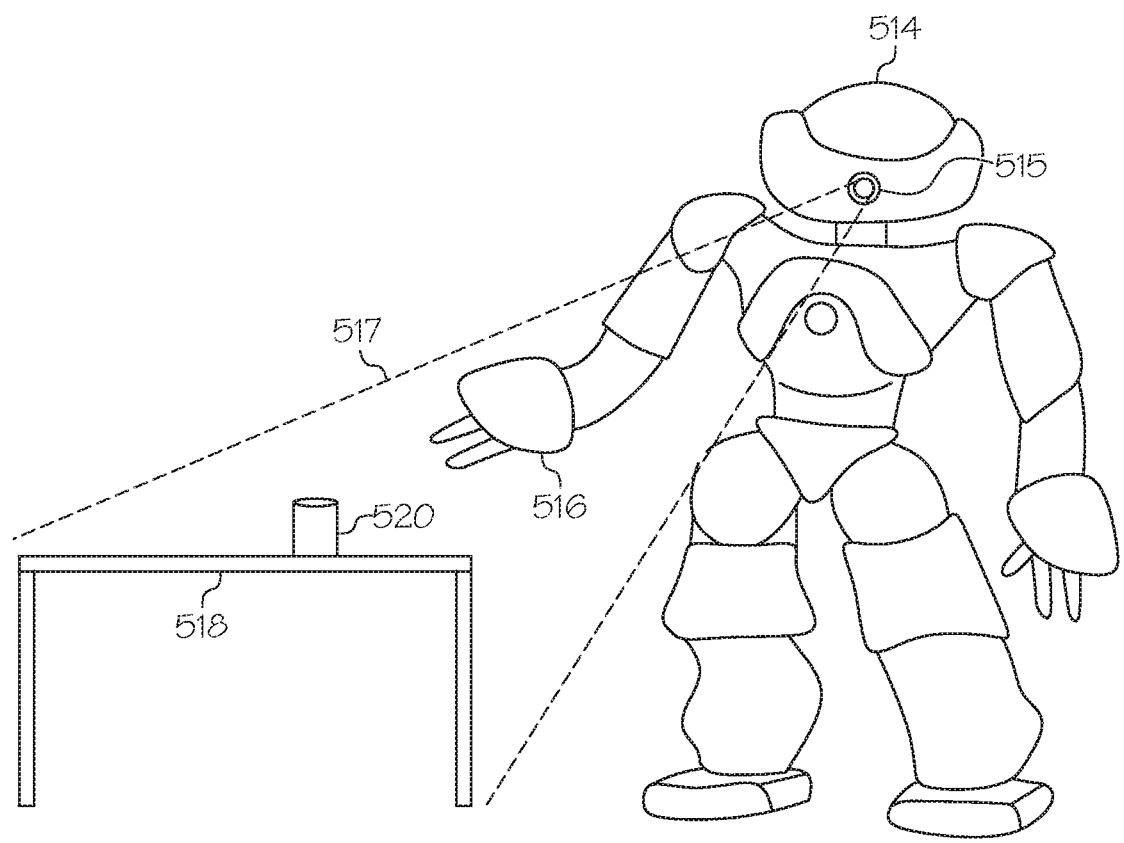
FIG. 5C depicts a frontal view of the robot performing the modified gesticular movement depicted in FIG. 5B, according to one or more embodiments shown and described herein.

Turning to FIG. 5C, a frontal view depicts an example of the robot performing the modified gesticular movement depicted in FIG. 5B. In this embodiment, the robot 514 extends the robot arm 516, while still keeping it bent, towards the selected object 520 (i.e., the glass) which corresponds to the selected object representation 512 depicted in FIG. 5B. Continuing with the example, this may be performed in view of the imaging device 515 of the robot 514, where the selected object 520 (the glass) sits atop another object 518 (the table).

Figure 6:
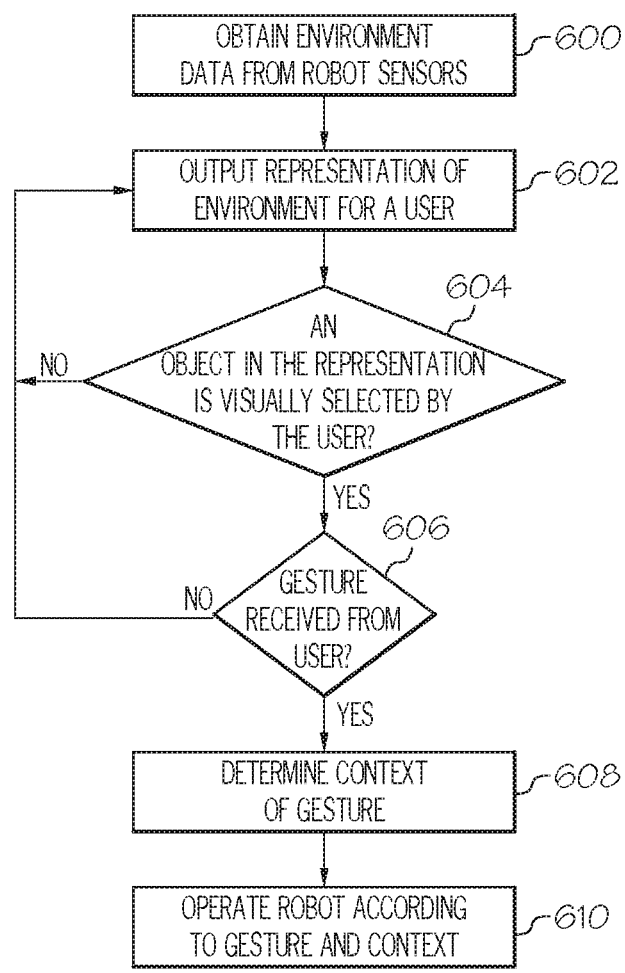
FIG. 6 depicts a flowchart of an exemplary process for a user utilizing gesture control for operating a robot utilizing a virtual representation of the robot's environment, according one or more embodiments shown and described herein.

Turning to FIG. 6, a flowchart illustrates an exemplary process for a user utilizing gesture control for operating a robot utilizing a virtual representation of the robot's environment. At block 600, environment data is obtained from one or more robot sensors, such as a camera. As discussed herein, the robot may perform object and/or image recognition on any objects within the robot field of view. At block 602, a representation of the robot's environment may be output to a user via a visual output device within a visual interface device, which may be worn by the user. At block 604, a determination may be made as to whether an object within the representation may be visually selected by the user. This may be accomplished, for example, by indicating to the user that an object may appears to be of interest based upon the user's gaze. The user may confirm selection of the object with any suitable mechanism, such as blinking. If an object is not confirmed by the user, then the flowchart returns to block 602. Otherwise, a determination at block 606 is made as to whether a gesture is received form the user. If no gesture is received, then the flowchart returns to block 602. Otherwise, if a gesture is received, then at block 608 the context of the gesture is determined, which may be based upon the selected object, the object's type, characteristics of the object, characteristics of the user, characteristics of the robot, characteristics of the visual interface device, etc. At block 610, the robot may be operated according to the gesture and the context of the gesture.

Figure 7:
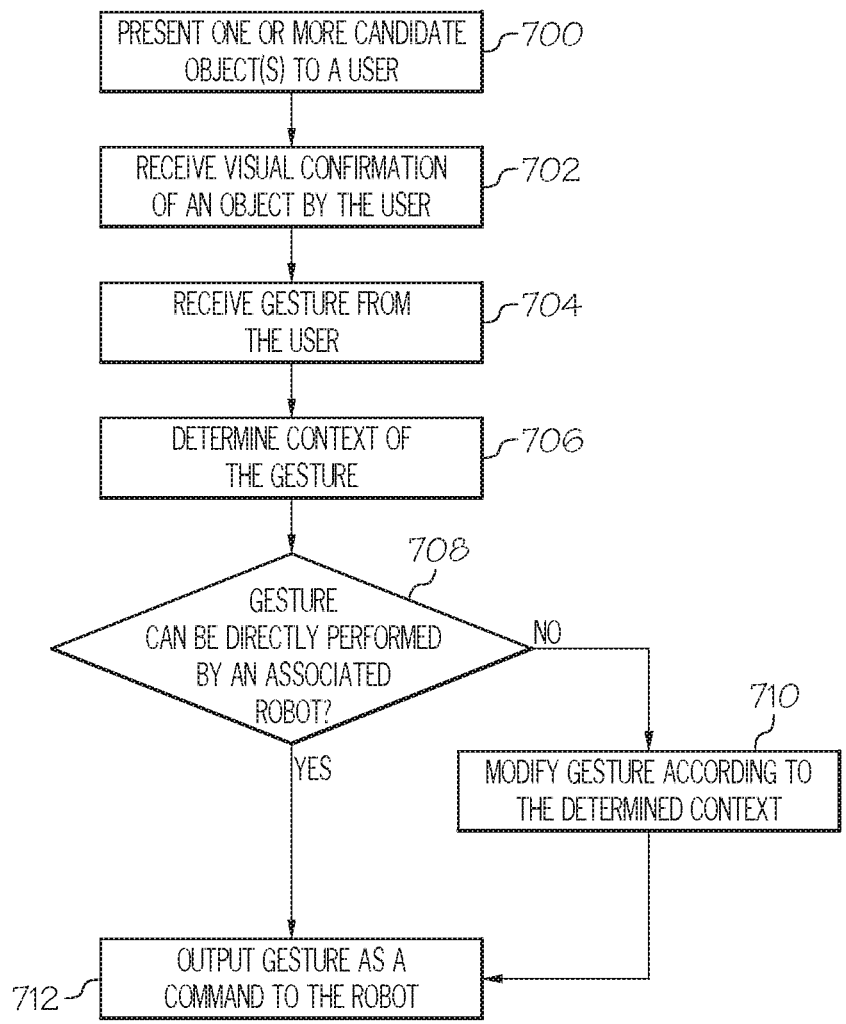
FIG. 7 depicts a flowchart of an exemplary process for user gesture modification based upon context, according to one or more embodiments shown and described herein.

Turning to FIG. 7, a flowchart illustrates an exemplary process for user gesture modification based upon the context. At block 700, one or more candidate objects are presented to a user. As discussed herein, the robot may perform object and/or image recognition on any objects within the robot's field of view. At block 702, visual confirmation from the user may be received pertaining to one of the candidate objects, where the user may confirm selection of the object with any suitable mechanism, such as eye blinking. At block 704, a gesture may be received from the user, which may be a gesture detected as movement in any part of the body of the user. At block 706, the context of the gesture may be determined, where the gesture may be determined based upon the selected object, the object's type, characteristics of the object, characteristics of the user, characteristics of the robot, and/or characteristics of the visual interface device, for example. At block 708, a determination may be made as to whether the user's gesture can be directly performed by the robot communicatively coupled to the visual interface device as well as sensors that measure the user's gestures. If not, then at block 710 the gesture may be modified according to the determined context, and the flowchart may proceed to block 712 where the gesture may be output as a command to the robot in the modified form. Otherwise, if the user's gesture can be directly performed by the robot, then at block 712 the gesture may be output as a command to the robot in an unmodified form.

It should now be understood that embodiments described herein are directed to determining teleoperating user intent via eye tracking. A user remotely operating a robot may wear a gaze-tracking device, which may receive imaging data from the robot to provide a representation of the robot's environment. The gaze tracking device may also receive the gaze of the user within the representation of the robot's environment such that context of the user's instructions to the robot may be determined based upon an object within the gaze area, an object type, and characteristics of the object. Based upon physical movement receiving from the user is received, a contextual command may be output to the robot that corresponding to the context and the object.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A method, comprising:
outputting a representation of an environment of a robot;
receiving, from a gaze-tracking device, user gaze data corresponding to a gaze area subject to a gaze of a user within the representation;
determining a context of an object within the gaze area, an object type, and characteristics of the object;
receiving, via a user interface, a user input;
outputting, to the robot, a contextual command corresponding to the context and the user input;
performing the contextual command via the robot; and
displaying a robot contextual movement representation that represents a potential future robot gesticular movement showing a preview of the robot's gesticular movement being performed by the robot and corresponding to user gesticular movement, the user input differing from the robot contextual movement representation and the contextual command as performed by the robot.

2. The method of claim 1, wherein determining the context comprises analyzing the gaze area, the object type, and the characteristics of the object via a neural network.

3. The method of claim 1, further comprising aborting the contextual command based upon an obstacle within the environment.

4. The method of claim 1, further comprising performing object recognition upon the representation of the environment of the robot utilizing an object database.

5. The method of claim 1, wherein one or more object representations are visually presented within the representation on a display of the gaze-tracking device to the user.

6. The method of claim 5, further comprising receiving a second user input, the second user input selecting one of the one or more object representations.

7. The method of claim 6, wherein the second user input comprises satisfying a minimum user gaze duration or detecting one or more blinks from the user.

8. A robotic teleoperative system for utilizing gaze detection to improve teleoperative robotic object interaction, the robotic teleoperative system comprising:
a processing device; and
a non-transitory, processor-readable storage medium, the non-transitory, processor-readable storage medium comprising one or more programming instructions that, when executed, cause the processing device to perform at least the following:
output, to a display of a gaze-tracking device utilized by a user, a representation of an environment of a robot;
receive, from the gaze-tracking device, user gaze data corresponding to a gaze area subject to a gaze of the user within the representation;
determine a context based upon an object within the gaze area, an object type, and characteristics of the object;
receive, via a user interface, a user input;
output, to the robot, a contextual command corresponding to the context and the user input;
perform the contextual command via the robot; and
display a robot contextual movement representation that represents a potential future robot gesticular movement to show the user a preview of the robot's gesticular movement being performed by the robot and corresponding to a gesticular movement by the user, wherein the user input differs from both the robot contextual movement representation and the contextual command as performed by the robot.

9. The robotic teleoperative system of claim 8, wherein the representation is a point cloud representation, a video representation, or an augmented reality representation.

10. The robotic teleoperative system of claim 8, wherein the non-transitory, processor-readable storage medium further comprises one or more programming instructions that, when executed, cause the processing device to utilize a confidence threshold for determining the contextual command.

11. The robotic teleoperative system of claim 8, wherein the non-transitory, processor-readable storage medium further comprises one or more programming instructions that, when executed, cause the system to modify the contextual command based upon an obstacle within the environment.

12. The robotic teleoperative system of claim 8, wherein the non-transitory, processor-readable storage medium further comprises one or more programming instructions that, when executed, cause the system to propagate the contextual command in response to latency with respect to delays in communications involving the environment representation, the user gaze data, the user input, or the contextual command.

13. The robotic teleoperative system of claim 8, wherein the contextual command performed by the robot differs from the physical movement of the user.

14. The robotic teleoperative system of claim 8, wherein the non-transitory, processor-readable storage medium further comprises one or more programming instructions that, when executed, cause the system to perform object recognition upon the representation of the environment of the robot utilizing an object database.

15. The robotic teleoperative system of claim 8, wherein the non-transitory, processor-readable storage medium further comprises one or more programming instructions wherein one or more object representations are visually presented within the representation to the user.

16. A system comprising:
a user worn device having a display that displays an environment of a robot to a user;
a gaze tracking module that tracks the gaze of the user in a scene of the environment displayed by the display;
a gesture tracking module that tracks the user's other physical movements; and
a processing device that:
  determines a type of object the user is viewing from information received from the gaze tracking module and current actions that the user is completing from information received from the gesture tracking module;
  uses the type of object and current actions to determine a context and the user's intent such that the user's gestures can be accurately mapped to a virtual object movement within the environment of the robot;
  instructs the robot to perform a contextual command in a manner that differs from the user's other physical movements;
  performs the contextual command via the robot; and
  displays a robot contextual movement representation that represents a potential future robot gesticular movement to show the user a preview of the robot's gesticular movement being performed by the robot and corresponding to a gesticular movement, wherein the user input differs from both the robot contextual movement representation and the contextual command as performed by the robot.

17. The method of claim 1, wherein the robot contextual movement representation represents the current movement of the robot arm.

18. The method of claim 1, wherein a determination of the contextual movement is delayed to alleviate disconnect between current movements of the user and the robot's contextual movement based upon encountered latency.

19. The robotic teleoperative system of claim 8, wherein the robot contextual movement representation represents the current movement of the robot arm.

20. The method of claim 1, wherein the robot's gesticular movement:
  corresponds to the gesticular movement of an arm of the user; and
  is a modified version of the user's gesticular movement.

* * * * *